US012166298B2

(12) United States Patent
Hu et al.

(10) Patent No.: US 12,166,298 B2
(45) Date of Patent: Dec. 10, 2024

(54) NARROW BEZEL MULTIBAND ANTENNA SUITABLE FOR A TABLET OR LAPTOP COMPUTER

(71) Applicant: Novocomms Ltd., Birmingham (GB)

(72) Inventors: Zhenhua Hu, Solihull (GB); Qing Liu, Birmingham (GB)

(73) Assignee: Novocomms Ltd, Birmingham (GB)

( * ) Notice: Subject to any disclaimer, the term of this patent is extended or adjusted under 35 U.S.C. 154(b) by 157 days.

(21) Appl. No.: 17/802,036

(22) PCT Filed: Feb. 24, 2021

(86) PCT No.: PCT/GB2021/050453
§ 371 (c)(1),
(2) Date: Aug. 24, 2022

(87) PCT Pub. No.: WO2021/170997
PCT Pub. Date: Sep. 2, 2021

(65) Prior Publication Data

US 2023/0100585 A1 Mar. 30, 2023

(30) Foreign Application Priority Data

Feb. 24, 2020 (GB) ...................................... 2002592

(51) Int. Cl.
*H01Q 9/42* (2006.01)
*H01Q 1/22* (2006.01)
(Continued)

(52) U.S. Cl.
CPC ............. *H01Q 9/42* (2013.01); *H01Q 1/2266* (2013.01); *H01Q 5/328* (2015.01); *H01Q 5/392* (2015.01)

(58) Field of Classification Search
CPC ...... H01Q 1/2266; H01Q 5/328; H01Q 5/392; H01Q 9/42
See application file for complete search history.

(56) References Cited

U.S. PATENT DOCUMENTS 8,610,628 B2 12/2013 Chen et al.
9,002,262 B1 * 4/2015 Kuo ....................... H01Q 5/378 455/39
(Continued)

FOREIGN PATENT DOCUMENTS

GB 2567905 A 5/2019

OTHER PUBLICATIONS

International Search Report and Written Opinion of International Application No. PCT/GB2021/050453 dated May 26, 2021, 14 pp.

*Primary Examiner* — Ab Salam Alkassim, Jr.
*Assistant Examiner* — Leah Rosenberg
(74) *Attorney, Agent, or Firm* — Shumaker & Sieffert, P.A.

(57) ABSTRACT

There is disclosed an antenna arrangement for a portable electronic device, comprising: a ground plane having an edge; and arranged along the edge, in sequence, a feed section, a grounded coupling section, and an extended coupling section. The feed section comprises an RF feed on the ground plane and a feed line extending from the RF feed having a first portion extending substantially perpendicularly from the edge of the ground plane, and a second portion extending from an end of the first portion, substantially parallel to the edge of the ground plane, in a direction away from the grounded coupling section. The grounded coupling section comprises a first conductive element extending substantially parallel to the edge of the ground plane and arranged to overlap or run adjacent to at least a part of the second portion of the feed line of the feed section, and a conductive member to connect the first conductive element to the ground plane. The extended coupling section comprises a conductive meander line extending generally parallel to the edge of the ground plane, one end of the conductive meander line being connected to or configured to couple with a portion of the grounded coupling section, the
(Continued)

other end of the conductive meander line being connected to a second conductive element extending substantially parallel to the edge of the ground plane.

18 Claims, 8 Drawing Sheets

(51) Int. Cl.
*H01Q 5/328* (2015.01)
*H01Q 5/392* (2015.01)

(56) References Cited

U.S. PATENT DOCUMENTS

| | | | | |
|---|---|---|---|---|
| 11,923,597 | B2 * | 3/2024 | Wu | H01Q 5/371 |
| 2009/0273521 | A1 * | 11/2009 | Wong | H01Q 9/26<br>343/700 MS |
| 2010/0328182 | A1 * | 12/2010 | Wong | H01Q 9/0421<br>343/848 |
| 2012/0001815 | A1 * | 1/2012 | Wong | H01Q 9/0421<br>343/843 |
| 2013/0050038 | A1 * | 2/2013 | Eom | H01Q 5/392<br>343/866 |
| 2013/0113661 | A1 * | 5/2013 | Chen | H01Q 9/42<br>343/700 MS |
| 2013/0207856 | A1 * | 8/2013 | Oon | H01Q 21/28<br>343/729 |
| 2015/0022422 | A1 | 1/2015 | Chang et al. | |
| 2015/0380820 | A1 * | 12/2015 | Wu | H01Q 5/378<br>29/601 |
| 2017/0194700 | A1 | 7/2017 | Hsiao | |
| 2022/0302589 | A1 * | 9/2022 | Koshi | H01Q 7/00 |
| 2023/0261370 | A1 * | 8/2023 | Hu | H01Q 9/0457<br>343/848 |
| 2024/0014555 | A1 * | 1/2024 | Wei | H01Q 5/371 |

* cited by examiner

FIG. 6
z
x
y
A/m
0
5
10
15
20
25
30
35
40
45
52.3
surface current (f=0.95) [1]
Type Surface current
Component Abs
Frequency 0.95 GHz
Wavelength 315.571 mm
Plot attribute Average
Maximum 269.771 A/m
Max position 300.977, -210.372, 3.280 mm

NARROW BEZEL MULTIBAND ANTENNA SUITABLE FOR A TABLET OR LAPTOP COMPUTER

This application is a national stage application under 35 U.S.C. § 371 of PCT Application No. PCT/GB2021/050453, filed 24 Feb. 2021, which claims the benefit of Great Britain Application No. 2002592.0, filed 24 Feb. 2020. The entire contents of each of PCT/GB2021/050453 and Great Britain Application No. 2002592.0 are incorporated herein by reference in their respective entireties.

This invention relates to a compact antenna arrangement configured to fit in or behind a low-profile laptop or tablet computer bezel or mobile handset bezel and to operate in the 5G and LTE WWAN bands with acceptable performance. Embodiments of the present disclosure may be configured to fit into or behind low-profile bezels in current generations of laptop and tablet computers and mobile handsets.

BACKGROUND

With the current advancement of technology in mobile telecommunications devices such as tablets, laptops and smartphones, the trend is towards supporting more wireless standards in thinner and more aesthetically desirable devices.

The desire for thinner devices often requires the use of metal monocoque shells which do not offer good passage of RF signals to and from an antenna. Similarly, there is also a drive for the screens of such devices to form larger areas of the front real-estate, meaning thinner and more low profile bezels on the device casing. This is a problem for wireless communication frequencies, and when coupled with the antenna being placed in close proximity to the device screen and other electronic components associated therewith, it becomes challenging for any antenna design to work effectively.

It is known to use plastic windows in metal covers or shells, in order that RF signals can pass easily, but this can detract from the aesthetic design of the device and is sometimes associated with less premium models in a range of devices. Other solutions include creating insulated slots in a rim around the casing to create either dipole or monopole antenna elements, such as on the Apple® iPhone® 4. However, such antennas are particularly susceptible to user intervention by shorting across the elements with the hand or fingers during use, which results in degradation of the signal.

Another solution is to use very small antenna arrangements behind the non-metal bezel of the device screen. These types of antenna are located in the small amount of free space that is bounded on an outside edge by metal casing and on an inside edge by the display screen. These types of antennas need to radiate a signal through either a slot of non-metal material in the rear of the device housing that may be disguised to have a metallic finish, or through a non-metal cover that forms the screen bezel. Prior art solutions where the bezel is relatively large (>10 mm in width) can provide good operation in the WLAN bands of 2.4 and 5.5 GHz. However, performance in these bands can be challenging with the latest models of devices having almost edge-to-edge screens with typical bezel widths of <10 mm, and in some cases <6 mm. Problems also arise with antennas requiring WWAN (Wireless Wide Area Networking) cellular functionality rather than just WLAN (Wireless Local Area Networking). WWAN requires the antenna structure to perform at mobile 5G and LTE frequencies, creating even more of a challenge. This is especially problematic in the low bands around 600-700 MHz, where traditional monopole elements need to be physically large for efficient performance, which can make it difficult to fit these monopole elements into very compact bezel regions.

BRIEF SUMMARY OF THE DISCLOSURE

In accordance with the present inventions there is provided an antenna arrangement for a portable electronic device, comprising:

a ground plane having an edge;

arranged along the edge, in sequence, a feed section, a grounded coupling section, and an extended coupling section;

wherein:

i) the feed section comprises an RF feed on the ground plane and a feed line extending from the RF feed having a first portion extending substantially perpendicularly from the edge of the ground plane, and a second portion extending from an end of the first portion, substantially parallel to the edge of the ground plane, in a direction away from the grounded coupling section;

ii) the grounded coupling section comprises a first conductive element extending substantially parallel to the edge of the ground plane and arranged to overlap or run adjacent to at least a part of the second portion of the feed line of the feed section, and a conductive member to connect the first conductive element to the ground plane; and iii) the extended coupling section comprises a conductive meander line extending generally parallel to the edge of the ground plane, one end of the conductive meander line being connected to the first conductive element of the grounded coupling section, the other end of the conductive meander line being connected to a second conductive element extending substantially parallel to the edge of the ground plane.

The first conductive element of the grounded coupling section is configured to couple electromagnetically with the second portion of the feed line of the feed section during operation of the antenna arrangement. This is achieved by way of the first conductive element of the grounded coupling section overlapping or running adjacent to the second portion of the feed line of the feed section.

The feed line of the feed section may have an L or inverted L configuration, comprising just the first and second portions. Alternatively, the feed line of the feed section may have a Π(pi) or U configuration or any other appropriate configuration, provided always that it includes a portion that runs substantially parallel and adjacent to a part of the first conductive element of the grounded coupling section so as to enable coupling therewith.

The feed section is configured to act as a monopole antenna in a given frequency band, and also to drive the grounded coupling section and the extended coupling section so as to enable operation in additional frequency bands.

The feed section may be provided with one or more parasitic conductive elements, which may be connected to the ground plane and/or may extend from the first portion, for example in a direction substantially parallel to the edge of the ground plane. The one or more parasitic conductive elements can help to create additional resonances and/or to broaden the frequency band in which the feed section operates.

The feed section may be configured to cover operating frequencies from around 1.7 GHz to 6 GHz. In some embodiments, the feed line of the feed section may be configured to provide a resonance at around 2.2 GHz, with a first parasitic element providing an additional resonance at around 5.5 GHz. Second or further parasitic elements may be provided to broaden the 5.5 GHz resonance down to 5 GHz, and/or to broaden the 2.2 GHz resonance down to 1.7 GHz.

The RF feed of the feed section may be provided with appropriate matching circuitry, for example a passive matching network.

The grounded coupling section is parasitically driven by the feed section, and is configured to act as an antenna operating in lower bands, for example covering 700 MHz to 1 GHz.

The conductive member of the grounded coupling section may be connected directly to the ground plane, or may be connected to the ground plane by way of a tuning circuit. The tuning circuit may comprise one or more capacitances and/or inductances and/or RF switches and/or varactors or combinations thereof. The tuning circuit may provide a passive network to alter an electrical length. In this way, the electrical length of the grounded coupling section may be adjusted so as to enable operation in even lower frequency bands, such as 500 MHz to 600 MHz.

The conductive member of the grounded coupling section may be substantially straight, or may comprise a meander section, for example a U-shaped meander section, so as to provide additional electrical length.

The extended coupling section, which is conductively connected to the grounded coupling section, provides a further resonating structure with a longer electrical length than the grounded coupling section. The longer electrical length is provided by the conductive meander line. The extended coupling section, cooperating and working in conjunction with the grounded coupling section, may provide resonances in the 900 MHz to 1 GHz frequency range.

A tuning circuit may be provided in the meander line of the extended coupling section so as to adjust an electrical length of the extended coupling section. The tuning circuit may comprise one or more capacitances and/or inductances and/or RF switches and/or varactors or combinations thereof. The tuning circuit may provide a passive network to alter the electrical length.

In some embodiments, the extended coupling section may comprise a first conductive member extending from the first conductive element of the grounded coupling section, at an end of the first conductive element remote from the feed section, towards the edge of the ground plane but not contacting the ground plane, the conductive meander line extending from the first conductive member in a direction generally parallel to the edge of the ground plane away from the feed section, the conductive meander line connected at an end remote from the first conductive member to a second conductive member extending substantially perpendicular to the edge of the ground plane but not contacting the ground plane, and a second conductive element extending from the second conductive member substantially parallel to the edge of the ground plane in a direction towards the feed section, with the conductive meander line disposed between the second conductive element and the edge of the ground plane.

In these embodiments, the first and second conductive elements may be substantially colinear. In other words, the first and second conductive elements may be disposed along substantially the same line running substantially parallel to the edge of the ground plane.

In other embodiments, the extended coupling section may comprise a continuation of the first conductive element of the grounded coupling section, extending away from the feed section and substantially parallel to the edge of the ground plane, with a conductive member extending from the end of the continuation of the first conductive element towards the edge of the ground plane but not contacting the ground plane, and the conductive meander line extending from the conductive member in a direction generally parallel to the edge of the ground plane towards the feed section, the meander line terminating at a second conductive element disposed between the first conductive element and the edge of the ground plane. The second conductive element may be disposed substantially parallel to the first conductive element and the edge of the ground plane.

In the context of the present disclosure, it is to be understood the conductive meander line extending in a direction generally parallel to the edge of the ground plane means that the overall length of the meander line extends in this direction, even though the meander line will undulate or meander in different directions at different points along its length. For example, the overall length of the meander line may be considered to extend in a direction corresponding to a direction of a best-fit or reasonable-fit straight line based on the undulating meander line.

In some embodiments, the respective sections of the antenna arrangement are disposed in a straight line along a single edge of the ground plane.

In other embodiments, the respective sections of the antenna arrangement are disposed around a corner of the ground plane where two adjacent edges meet. For example, the feed section may be disposed on one edge of the ground plane, and the grounded coupling section and the extended coupling section are disposed on an adjacent, substantially perpendicular edge of the ground plane.

The various conductive elements, members, feed lines and/or meander lines may be substantially coplanar with the ground plane, or disposed in one or more planes substantially parallel to the ground plane. In other embodiments, one or more of the various conductive elements, members, feed lines and/or meander lines may be disposed in planes substantially orthogonal to the plane of the ground plane. For example, one or more of the various conductive elements, members, feed lines and/or meander lines may be formed as a metallic strip having a length that extends in a plane substantially coplanar with or parallel to a plane of the ground plane, but with a width that extends in a plane substantially orthogonal to the plane of the ground plane.

One or more of the various conductive elements, members, feed lines and/or meander lines may be formed or printed on a dielectric substrate. Laser direct structuring or similar techniques may be used. The dielectric substrate may be a solid substrate, for example a PCB substrate or an inside surface of a housing of the portable electronic device, or may be a flexible substrate that may be wrapped around a solid dielectric former or adhered to an inside surface of a housing of the portable electronic device. In some embodiments, one or more of the various conductive elements, members, feed lines and/or meander lines may be cut or stamped from metal sheet and effectively self-supporting. Combinations of the above may also be employed.

In some embodiments, the first conductive element of the grounded coupling section and, where present, the second conductive element of the extended coupling section, may be formed with a width that extends across a thickness of the housing of the portable electronic device. The width may be increased by employing an L or U shaped cross section, for example so that the first conductive element of the grounded coupling section and, where present, the second conductive element of the extended coupling section is generally conformal to an internal contour of an edge region of the housing. Increasing the width of the first (and optionally the second) conductive element in this way can help to improve low band performance of the antenna arrangement.

BRIEF DESCRIPTION OF THE DRAWINGS

Embodiments of the invention are further described hereinafter with reference to the accompanying drawings, in which.

DETAILED DESCRIPTION

Laptop computer devices typically are of a clamshell design comprising a screen part and a keyboard part that folds and cooperates shut with the screen part. Tablet devices are a similar form-factor but typically only comprise the screen part. The industry has particular terms for parts of the casing used in these designs.

Figure 1:
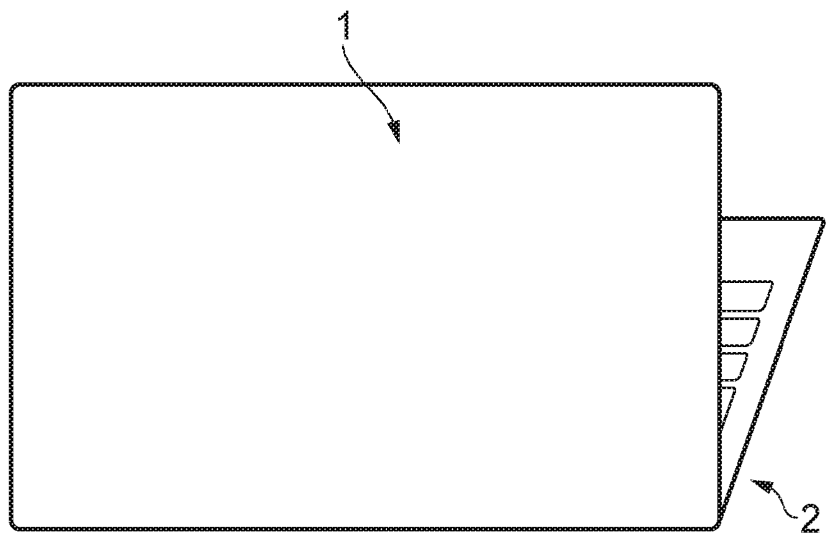
FIG. 1 shows a rear elevation of a clamshell laptop device.

FIG. 1 illustrates such a laptop, from a rear elevation, with the casing comprising different covers. In the industry, the cover 1 on the back of the screen is denoted the A-cover, and the cover 2 underneath the laptop that contacts the surface upon which the device rests in normal use is denoted the D-cover.

Figure 2:
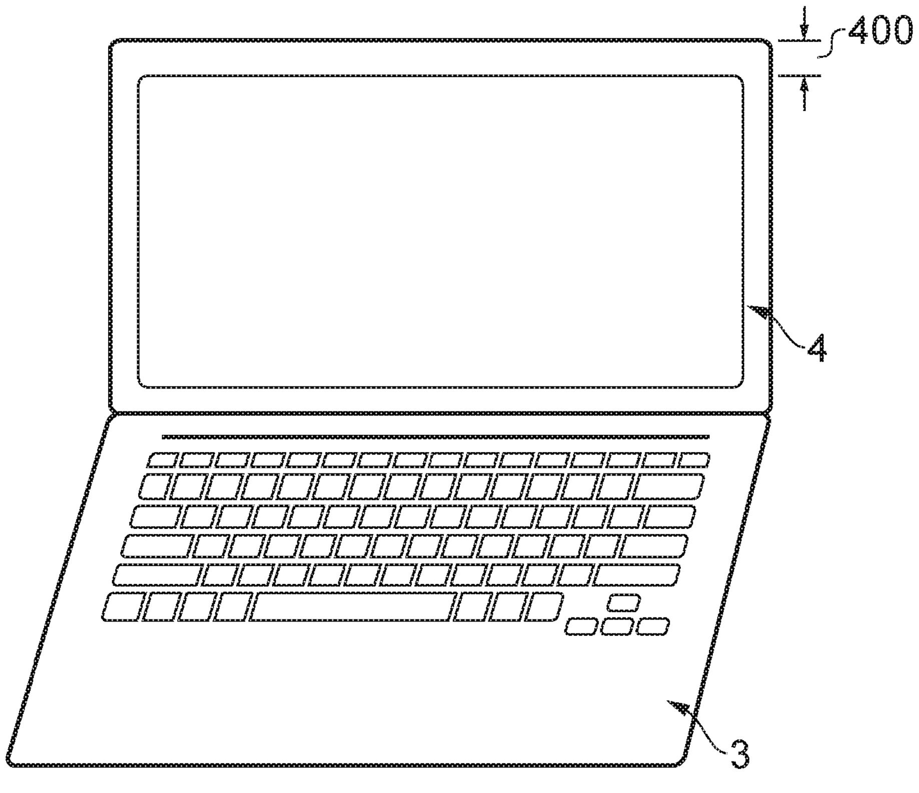
FIG. 2 shows a front elevation of a clamshell laptop device.

FIG. 2 shows the same laptop from a front elevation, and shows the screen front cover 4, including the bezel 400, which is denoted the B-cover. Finally, the cover 3 that surrounds the keyboard is denoted the C-cover.

Some embodiments of the present disclosure are suitable for use in a typical tablet or convertible tablet that can dock with a keyboard. In these embodiment, the main device will only have the A and B covers in the standalone tablet mode. In addition, the motherboard and battery may be housed behind the screen to form an all-in-one unit.

An antenna designer will be provided with details of the locations of non-metallic cut-outs in the A-cover (screen back), the width of the bezel of the B-cover, and/or any cut-outs in the keyboard section, for example the D-cover (keyboard base) and the required frequency bands across which the antenna arrangement is required to operate.

The antenna arrangement of embodiments of the present disclosure may be configured to fit into an opening of approximately 100 mm in length and approximately 6 mm in height. An antenna arrangement configured to operate in the bands required by 5G WWAN is now considered.

Figure 3:
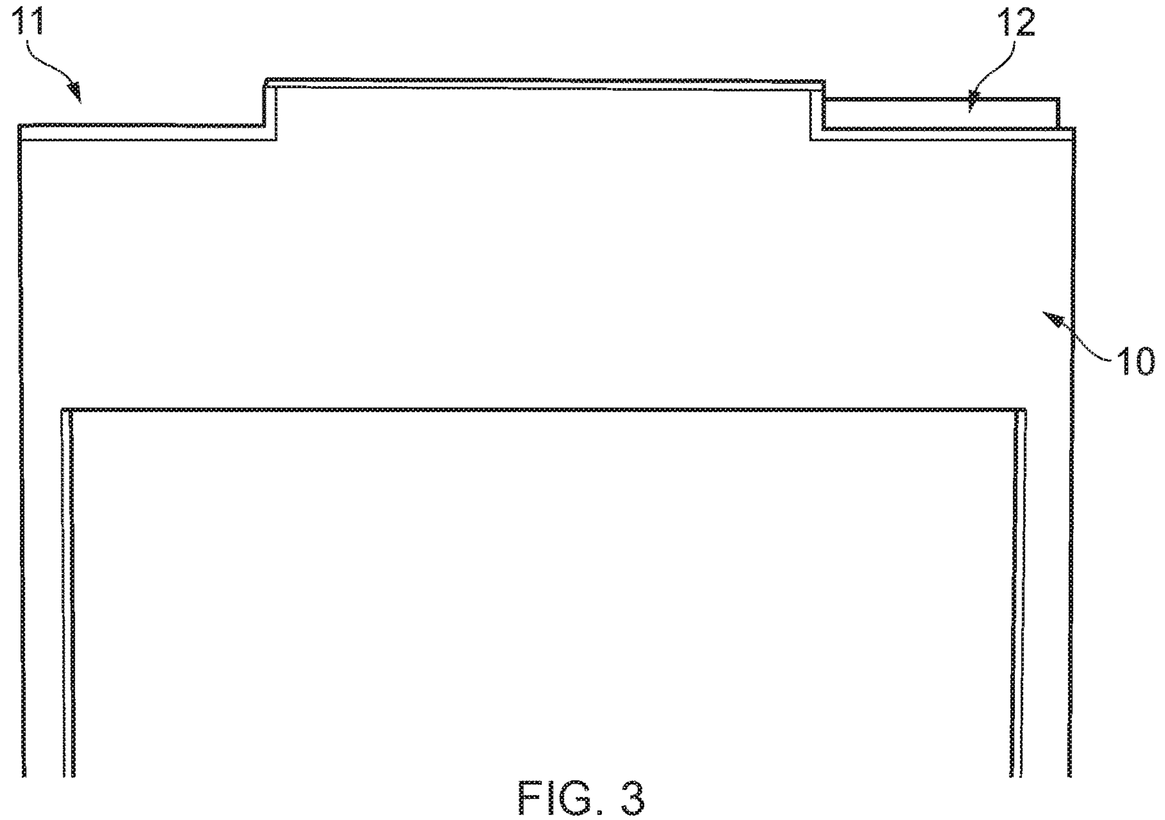
FIG. 3 shows a laptop/tablet A or D cover with RF window cut-outs.

An RF cut-out 11 in the A or D cover is illustrated in FIG. 3. There is also shown a PCB 10 defining a conductive ground plane. The typical size of the RF cut-out 11 (which is an aperture in the cover that is transparent to RF signals) in the latest generation of tablets and laptops is typically less than 100 mm in length and less than 10 mm in height. Certain elements of the antenna conductive patterns could be formed on a dielectric carrier or substrate 12 which is sized to fit in the cut-out 11.

Figure 4:
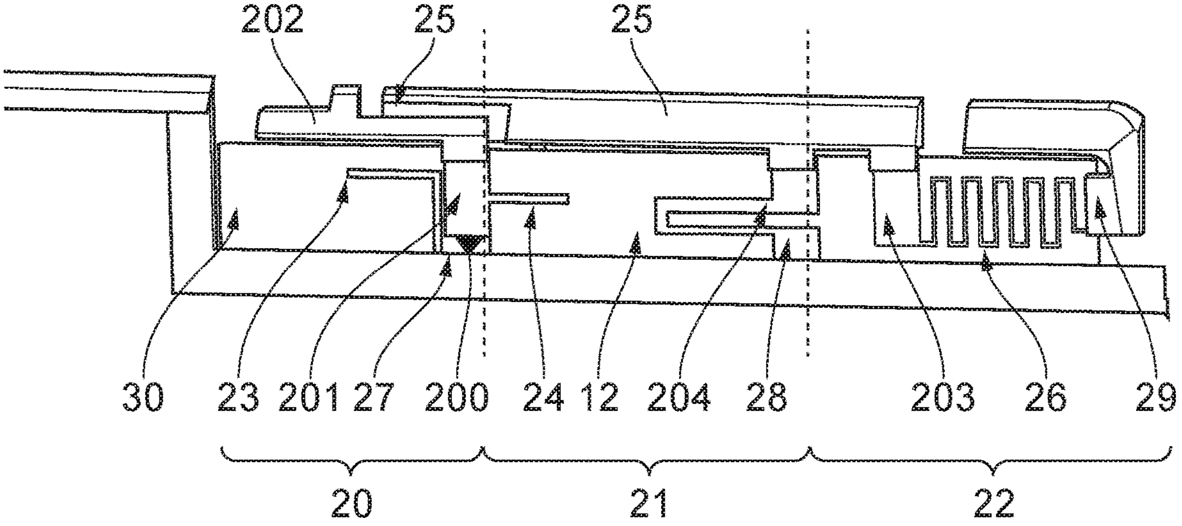
FIG. 4 shows an antenna arrangement according to a first embodiment.

FIG. 4 illustrates the antenna arrangement according to a first embodiment of the present disclosure. The arrangement, partly formed on a dielectric carrier 12, comprises three sections: i) a feed section 20, ii) a grounded coupling section 21, and iii) an extended coupling section 22.

The feed section 20, in this embodiment, comprises a substantially inverted L-shaped feed line, with an RF feed 200 on the ground plane and a vertical portion 201 extending away from the edge 27 of the ground plane, and a subsequent horizontal portion 202 extending parallel to the ground plane. The feed section 20 acts as both a coupled feed for an adjacent antenna element (described below), and functions as a monopole antenna in its own right. The feed section 20 is designed to cover frequencies in a range of 1.7 GHz to 6 GHz. The vertical 201 and horizontal 202 portions of the feed line create a resonance in the 2.2 GHz band, and an extension element 24, extending horizontally from the vertical portion 201, couples and helps to create a resonance around 5.5 GHz. A second grounded, inverted L-shaped parasitic element 23 may be provided to helps broaden the resonance around 5.5 GHz down to 5 GHz. The feed 200 can be provided with associated matching circuitry such as a passive network (not shown).

The grounded coupling section 21 is formed from a vertical section 28 extending from the edge 27 of ground plane, and having a substantially U-shaped meander 204 extending horizontally, before connecting to a top conductive portion 25 which extends horizontally to couple or cooperate with the L-shape section 201, 202 of the feed line. This section is responsible for resonances at the low bands covering 700 MHz-1 GHz, and is excited through coupling with the feed section 20. The gap between the horizontal portion 202 of the feed line and the top conductive portion 25 of the grounded coupling section 21 may be approximately 1 mm, and more preferably approximately 0.5 mm. It should be noted that the feed section 20, in this embodiment, is shown as being substantially L-shaped. However, it could be U-shaped, pi-shaped or any other shape that has a portion close enough to couple with the top conductor 25 of the grounded coupling section 21.

The extended coupling section 22 in this embodiment is required to be physically coupled to the grounded coupling section 21, although in other embodiments it may be configured to couple with the grounded coupling section 21 during operation of the antenna arrangement without being electrically connected to the grounded coupling section 21. The extended coupling section 22 comprises an extension to the top element 25 of the grounded coupling section 21, at a position away from the feed section 20, with a thick conductor element 203 extending vertically downwards towards the edge 27 of the ground plane, but not contacting the ground plane. Extending horizontally from the thick conductor element 203, in a direction away from the feed section 20, is a thin meander line structure 26, providing the required electrical length. At the end of the meander line 26 is a final element 29, which is substantially L-shaped and extends vertically upwards at the end of the meander line 26 and has a horizontal portion that runs towards the feed section parallel to the meander line 26. The extended coupling section 22 provides another resonating structure with a longer electrical length than the grounded coupling section 21 and cooperates and works in conjunction with the grounded coupling section 22 to provide resonances in the 900 MHz-1 GHz frequency ranges.

The grounded coupling section 21 may be connected to the ground plane using a tuning element (not shown). The tuning element could be in the form of one or more capacitances and/or inductors, RF switches, varactor elements, or combinations thereof to form passive networks to alter electrical length. This may allow wider coverage in low bands down to 500-600 MHz. A tuner could also be placed at some length along the meander line element 26 of the extended coupling section 22 to provide similar functionality.

Figure 9:
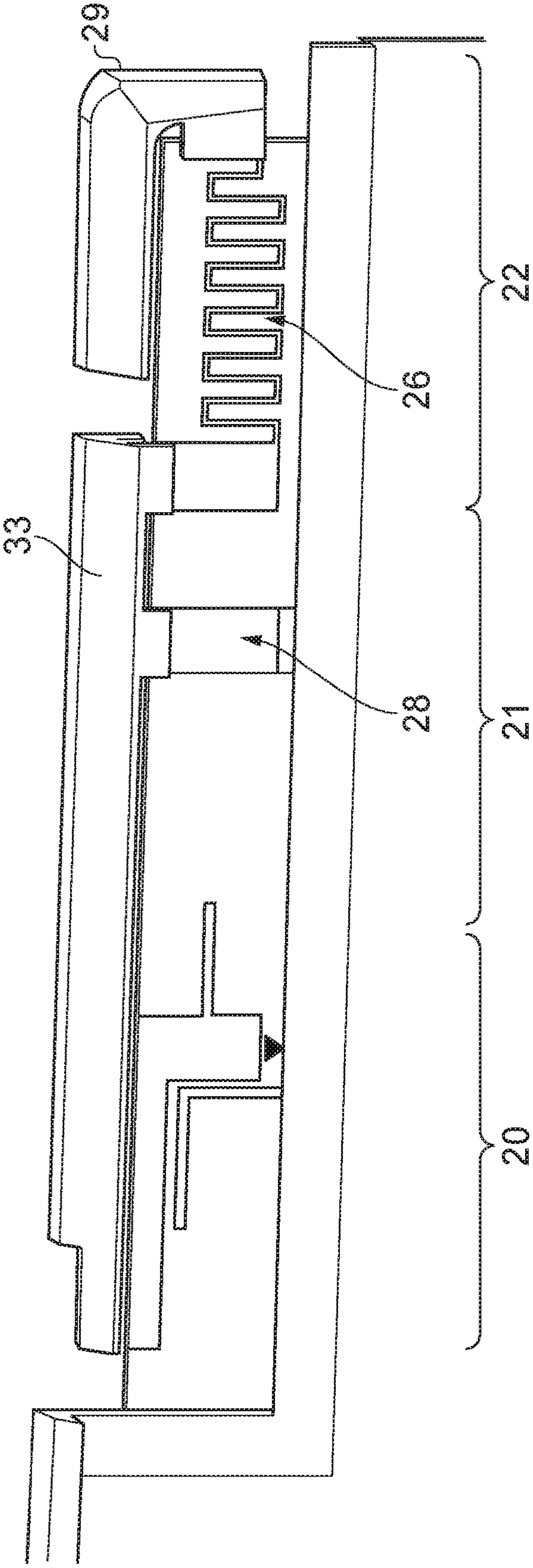
FIG. 9 shows an alternative arrangement for second section grounding portion.

FIG. 9 shows a variation of the embodiment of FIG. 4, where the thick vertical section 28 of the grounded coupling section 21 does not have a U-shaped meander portion but instead extends straight down to the edge 27 of the ground plane. In this embodiment, the length of meander line 26 of the extended coupling section 22 may be increased to offset the loss in electrical length in the vertical section 28.

Figure 5:
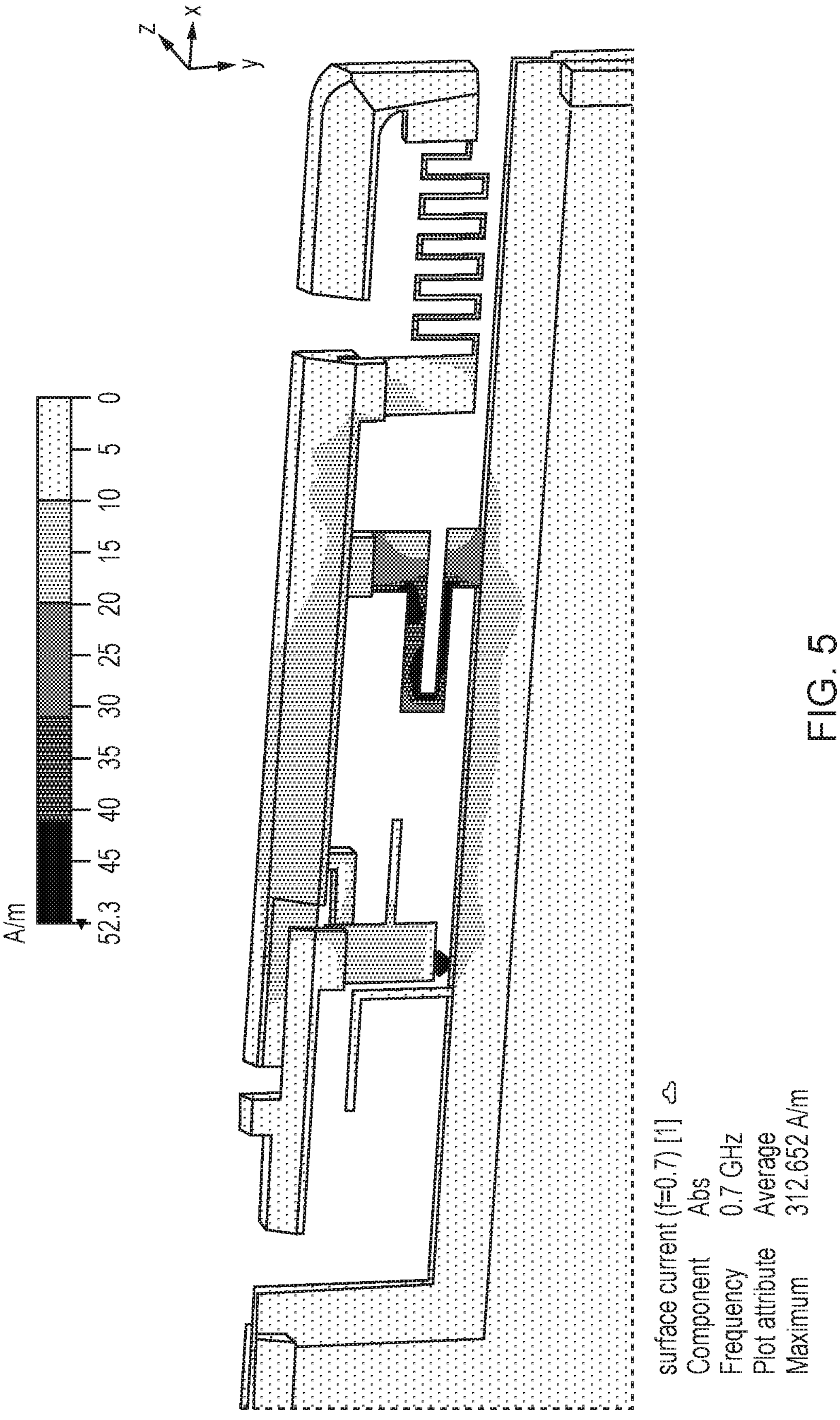
FIG. 5 shows simulated surface currents for 700 MHz.

FIG. 5 shows the simulated surface currents of the antenna arrangement of the embodiment of FIG. 4 at 700 MHz. FIG. 5 illustrates the main role of the grounded coupling section 21 of the antenna arrangement in this resonance by the lighter shading, indicating a high concentration of surface currents in this region. The main upright part of the feed section 20 and the wide and meander line parts of the extended coupling section 22 also contribute as they contain lower levels of surface currents.

Figure 6:
FIG. 6 shows simulated surface currents for 950 MHz.

FIG. 6 shows the simulated surface currents of the antenna arrangement at 950 MHz. FIG. 5 illustrates high concentrations of currents on the upright of the feed section 20, the entire grounded coupling section 21, and also along the thick portion, meander line and end structure of the extended coupling section 22. This resonance utilises the coupling and cooperation of all sections of the antenna arrangement.

Figure 7:
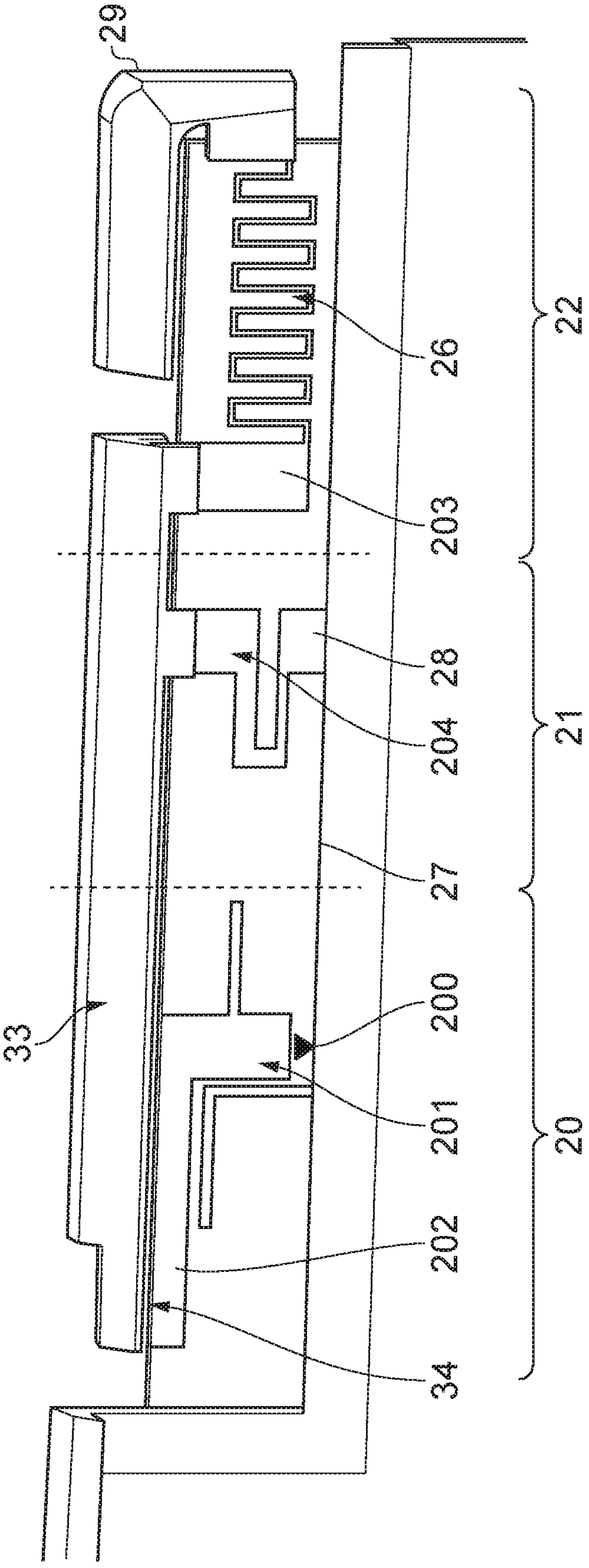
FIG. 7 shows an antenna arrangement according to a second embodiment.

FIG. 7 illustrates a second embodiment of the antenna arrangement according to the present disclosure. The arrangement contains the same three sections as the first embodiment: i) the feed section 20, ii) the grounded coupling section 21, and iii) the extended coupling section 22. The difference in this embodiment relates to the top conductor element 33 of the grounded coupling section 21. In the second embodiment, this runs horizontally over the top of the feed section 20 and the coupling takes place vertically across gap 34, rather than horizontally as in the first embodiment.

Figure 8:
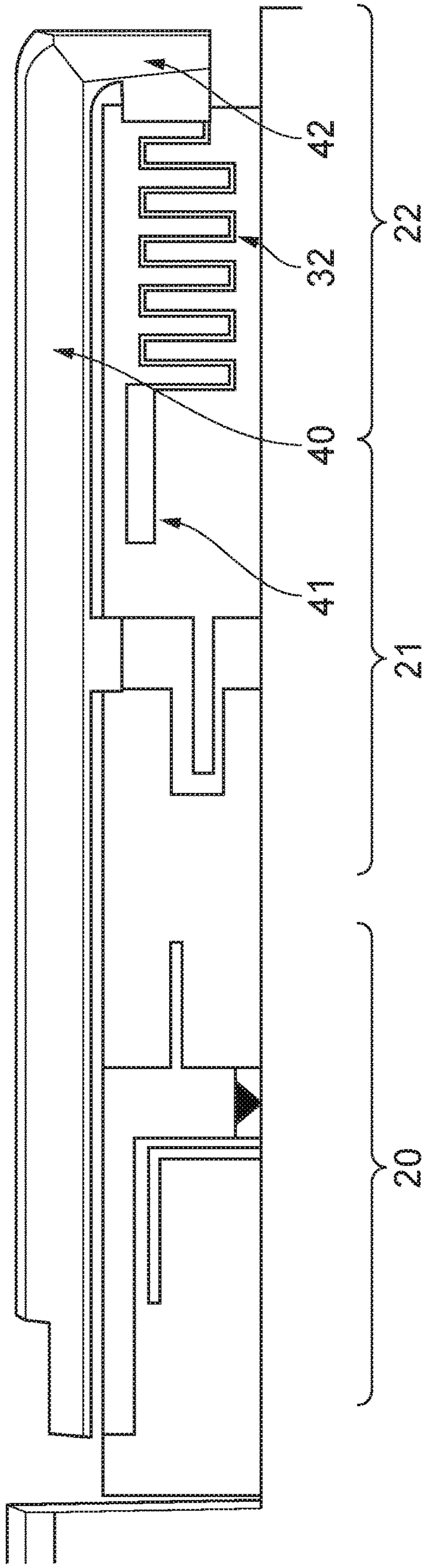
FIG. 8 shows an antenna arrangement according to a third embodiment.

FIG. 8 illustrates an antenna arrangement according to a third embodiment of the present disclosure. The arrangement comprises the three sections, in common with previous embodiments: i) the feed section 20, ii) the grounded coupling section 21, and iii) the extended coupling section 22.

This embodiment has a different third, extended coupling section. Instead of the section beginning from an element protruding vertically downwards from the top conductor of the grounded coupling section 21, this embodiment relies on a single, long top conductor element 40 that covers the length of the antenna arrangement and curves to form a downwards portion 42 at the end opposite the feed section 20. From this downward section, the meander line portion 32 extends horizontally towards the grounding vertical portion of the grounded coupling section 21 and has a straight portion 41 at a distal end of the meander line 32.

Figure 10:
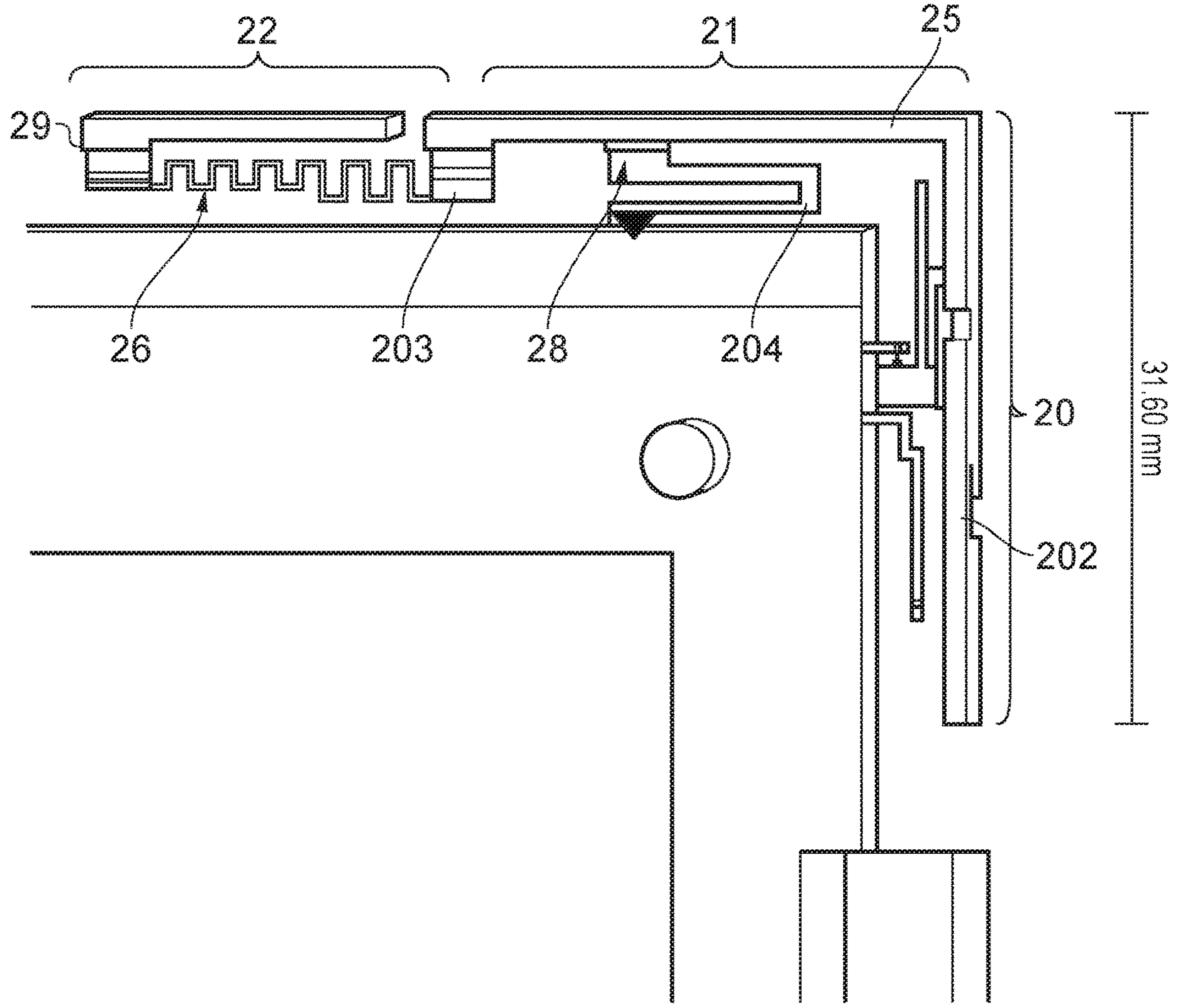
FIG. 10 shows an antenna arrangement according to a fourth embodiment.

FIG. 10 illustrates an antenna arrangement according to a fourth embodiment of the present disclosure. The arrangement comprises the three sections: i) the feed section 20; ii) the grounded coupling section 21, and iii) the extended coupling section 22. The feed section 20 is located on one edge of a corner of the ground plane, while the grounded coupling section 21 and extended coupling section 22 of the arrangement are located on an adjacent edge of the ground plane corner. The top conductor 25 of the grounded coupling section 21 bends through 90 degrees around the corner of the ground plane in order to provide the coupling with the feed section top conductor 202.

This embodiment may be useful for a laptop device where there may be more room in the A or D covers, and therefore performance can be increased with the increased device length. The antenna arrangement is also able to radiate in multiple directions more effectively and the relevant resonating elements have access to a larger area of the device ground plane to create surface currents and radiate efficiently.

It should be noted that all of the embodiments could benefit from optional features described such as: conductive elements being in an orthogonal plane to the groundplane, or a tuner device placed on the grounding element of the second section, or antenna conductive elements being metal stamped or all formed on a dielectric carrier or a combination.

It should also be noted that the currently described embodiments comprise an antenna arrangement formed by vertical conductive elements formed on a dielectric carrier 12 in combination with horizontal top elements formed from stamped and formed metal, or the device casing. However, all conductive elements could be formed on a dielectric carrier, or on flexible substrate and wrapped around a carrier, or entirely from metal stamped elements.

It should also be noted that the conductor elements could be arranged in a plane orthogonal to the groundplane, rather than in the same plane as in the illustrated embodiments. The orientation would depend on the constrictions of the environment created in the casing of the device in which the antenna arrangement is placed.

It should also be noted that the width of the top conductor elements, especially in the case where they are formed as part of the device casing by laser direct formation of metallic components such as LDS or similar. In this case, the width of the top conductor could be increased by forming a L-shape or U-shape cross-section conformally around the contour of the casing edge. This width can help to generate the low-bands correctly in the antenna arrangement.

Figure 11:
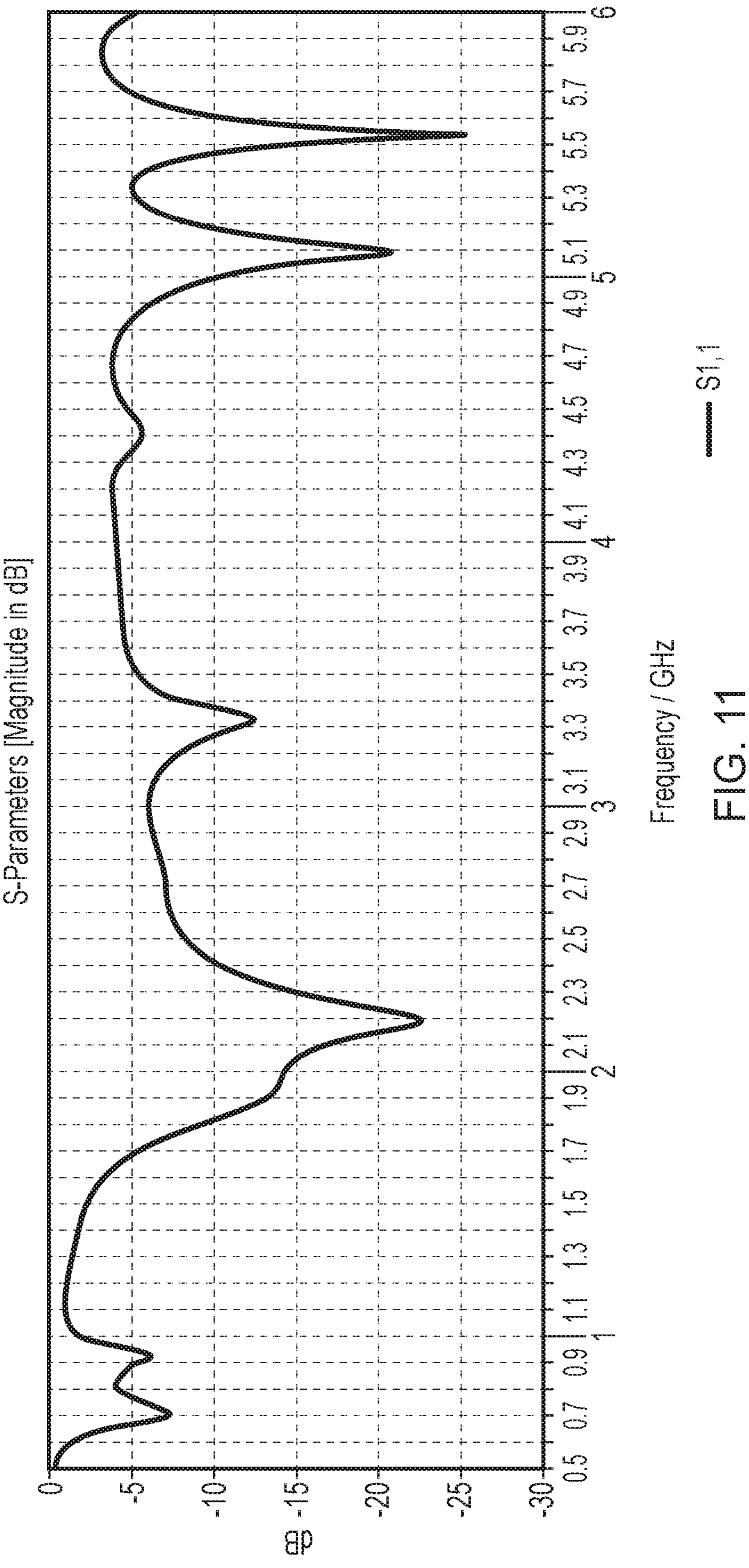
FIG. 11 shows simulated S-Parameters for the antenna arrangement.

FIG. 11 shows the simulated S-Parameter performance of a passive (non-tuned) antenna arrangement. The S-Parameter measurement indicates how much input signal is reflected back to the source. Accordingly, a high loss indicates a resonance at a particular frequency, indicative of the antenna transmitting the source signal and therefore creating a loss.

It can be seen that the antenna arrangement has well-defined resonances in the 700 MHz-1 GHz region; further deep, wideband resonance covering 1.7-3.5 GHz; and further resonances at 5-5.7 GHz. This simulated performance indicates good operation in the required 5G WWAN bands. The lower bands, in the region of 600-700 MHz, can be addressed using tuners on portions of the antenna arrangement.

Various aspects and embodiments may be understood with reference to the following numbered clauses:

1. An antenna arrangement suitable for a portable electronic device comprising:
   a ground plane with an edge, a first end and a second end;

a feed element situated towards a first end of the groundplane and having a vertical portion connected to a feed on the groundplane and a horizontal portion, forming a first top conductor, situated at the distal end of the vertical portion and positioned parallel with the groundplane, in a direction towards the first end;

a grounded coupling element with a second top conductor running parallel with the groundplane and a vertical section connecting the top conductor to ground;

wherein the top conductor is configured to couple with the horizontal portion of the feed element;

an extended coupling portion formed from a downwards vertical extension of the second top conductor of the grounded coupling element, situated towards the second end of the groundplane;

a meanderline portion extending horizontally in a direction towards the groundplane second end, the end portion of the meanderline having a vertical section to connect with a third top conductor.

2. The antenna arrangement as per clause 1, wherein the meanderline is electrically connected to the vertical extension of the grounded coupling portion.

3. The antenna arrangement as per clause 1, wherein the meanderline is coupled but not directly connected to the vertical extension of the grounded coupling portion.

4. The antenna arrangement as per any one of clauses 1 to 3, wherein the feed element has one or more parasitic elements arranged in close proximity to couple.

5. The antenna arrangement as per any one of clauses 1 to 4, wherein the top conductor elements are electrically connected to form one long top conductor.

6. The antenna arrangement as per any one of clauses 1 to 5, wherein the first top conductor and the second top conductor are configured to couple with an overlap portion and gap of less than 1 mm.

7. The antenna arrangement as per any one of clauses 1 to 6, wherein the first top conductor and the second top conductor are configured to couple with an overlap portion and gap of 0.5 mm or less.

8. The antenna arrangement as per any one of clauses 1 to 7, wherein the vertical portion of the grounded coupling element is substantially U-shaped, with the protrusion in the direction of the groundplane first end.

9. The antenna arrangement as per any one of clauses 1 to 8, wherein the feed portion and the grounded coupling and extended coupling portions are arranged around a 90 degree bend, with the feed portion on one side, and the grounded coupling and extended coupling portions situated on the other side.

10. The antenna arrangement as per any one of clauses 1 to 9, wherein the top conductor elements are L-shaped in cross-section, or a portion orientated in an orthogonal plane.

11. The antenna arrangement as per clause 10, wherein the top conductor elements form part of the device bezel or casing.

12. The antenna arrangement as per any one of clauses 1 to 11, wherein the vertical portion of the grounded coupling element is connected to the groundplane through a tuner.

13. The antenna arrangement as per any one of clauses 1 to 12, wherein the meanderline element is connected to the groundplane through a tuner.

14. The antenna arrangement as per clause 12 or 13, wherein the tuner comprises: a varactor, inductor, capacitance, RF switches, or a combination thereof.

15. A portable electronic device containing an antenna arrangement comprising:

a ground plane with an edge, a first end and a second end;

a feed element situated towards a first end of the groundplane and having a vertical portion connected to a feed on the groundplane and a horizontal portion, forming a first top conductor, situated at the distal end of the vertical portion and positioned parallel with the groundplane, in a direction towards the first end;

a grounded coupling element with a second top conductor running parallel with the groundplane and a vertical section connecting the top conductor to ground;

wherein the top conductor is configured to couple with the horizontal portion of the feed element;

an extended coupling portion formed from a downwards vertical extension of the second top conductor of the grounded coupling element, situated towards the second end of the groundplane;

a meanderline portion extending horizontally in a direction towards the groundplane second end, the end portion of the meanderline having a vertical section to connect with a third top conductor.

Throughout the description and claims of this specification, the words “comprise” and “contain” and variations of them mean “including but not limited to”, and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader’s attention is directed to all papers and documents which are filed concurrently with or previous to this specification in connection with this application and which are open to public inspection with this specification, and the contents of all such papers and documents are incorporated herein by reference.

The invention claimed is:

1. An antenna arrangement for a portable electronic device, the antenna arrangement comprising:

a ground plane having an edge;

arranged along the edge, in sequence, a feed section, a grounded coupling section, and an extended coupling section;

wherein:

i) the feed section comprises an RF feed on the ground plane and a feed line extending from the RF feed having a first portion extending substantially perpendicularly from the edge of the ground plane, and a second portion extending from an end of the first portion, substantially parallel to the edge of the ground plane, in a direction away from the grounded coupling section;

ii) the grounded coupling section comprises a first conductive element having first and second opposed end portions, the first conductive element extending substantially parallel to the edge of the ground plane, wherein the first end portion of the first conductive element is arranged to overlap or run adjacent to at least a part of the second portion of the feed line of the feed section, and a conductive member to connect the first conductive element to the ground plane; and iii) the extended coupling section comprises a conductive meander line extending generally parallel to the edge of the ground plane, one end of the conductive meander line being connected to or configured to couple with the second end portion of the grounded coupling section, the other end of the conductive meander line being connected to a second conductive element, not being part of the grounded coupling section, extending substantially parallel to the edge of the ground plane.

2. The antenna arrangement as claimed in claim 1, wherein the conductive meander line is electrically connected to the portion of the grounded coupling section.

3. The antenna arrangement as claimed in claim 1, wherein the conductive meander line is not electrically connected to the portion of the grounded coupling section but is configured to couple therewith during operation of the antenna arrangement.

4. The antenna arrangement as claimed in claim 1, wherein the extended coupling section comprises a first conductive member extending from the first conductive element of the grounded coupling section, at an end of the first conductive element remote from the feed section, towards the edge of the ground plane but not contacting the ground plane, the conductive meander line extending from the first conductive member in a direction generally parallel to the edge of the ground plane away from the feed section, the conductive meander line connected at an end remote from the first conductive member to a second conductive member extending substantially perpendicular to the edge of the ground plane but not contacting the ground plane, and a second conductive element extending from the second conductive member substantially parallel to the edge of the ground plane in a direction towards the feed section, with the conductive meander line disposed between the second conductive element and the edge of the ground plane.

5. The antenna arrangement as claimed in claim 1, wherein the extended coupling section comprises a continuation of the first conductive element of the grounded coupling section, extending away from the feed section and substantially parallel to the edge of the ground plane, with a conductive member extending from the end of the continuation of the first conductive element towards the edge of the ground plane but not contacting the ground plane, and the conductive meander line extending from the conductive member in a direction generally parallel to the edge of the ground plane towards the feed section, the meander line terminating at a second conductive element disposed between the first conductive element and the edge of the ground plane.

6. The antenna arrangement as claimed in claim 1, additionally comprising one or more parasitic conductive elements disposed adjacent to the feed section and configured to couple therewith during operation of the antenna arrangement.

7. The antenna arrangement as claimed in claim 1, wherein the first conductive element of the grounded coupling section is configured to overlap or run adjacent to the second portion of the feed line of the feed section with a gap of no more than 1 mm therebetween, optionally with a gap of no more than 0.5 mm therebetween.

8. The antenna arrangement as claimed in claim 1, wherein the conductive member of the grounded coupling section connecting the first conductive element to the ground plane incorporates a meander section.

9. The antenna arrangement as claimed in claim 8, wherein the meander section is U-shaped and projects towards the feed section.

10. The antenna arrangement as claimed in claim 1, wherein the feed section, the grounded coupling section and the extended coupling section are arranged sequentially along a straight edge of the ground plane.

11. The antenna arrangement as claimed in claim 1, wherein the feed section, the grounded coupling section and the extended coupling section are arranged sequentially about a corner of the ground plane, the corner defined by first and second adjacent edges of the ground plane.

12. The antenna arrangement as claimed in claim 11, wherein the feed section is disposed on the first edge of the ground plane and the grounded coupling section and the extended coupling section are disposed on the second edge of the ground plane.

13. The antenna arrangement as claimed in claim 1, wherein the first conductive element of the grounded coupling section and, where provided, the second conductive element of the extended coupling section, have at least portions that are disposed in a plane substantially orthogonal to the ground plane.

14. The antenna arrangement as claimed in claim 13, wherein the first conductive element of the grounded coupling section and, where provided, the second conductive element of the extended coupling section, have at least portions with an L-shaped or curved cross-section.

15. The antenna arrangement as claimed in claim 1, wherein the first conductive element of the grounded coupling section and, where provided, the second conductive element of the extended coupling section form part of a bezel or housing of the portable electronic device.

16. The antenna arrangement as claimed in claim 1, wherein the conductive member of the grounded coupling member connects the first conductive element to the ground plane by way of a tuning circuit.

17. The antenna arrangement as claimed in claim 16, wherein the tuning circuit comprises at least one of: a varactor, a capacitor, an inductor, an RF switch and combinations thereof.

18. A portable electronic device comprising the antenna arrangement of claim 1.

* * * * *